(12) United States Patent
Wells

(10) Patent No.: US 11,626,638 B2
(45) Date of Patent: Apr. 11, 2023

(54) BATTERIES AND METHODS OF USING AND MAKING THE SAME

(71) Applicant: EaglePicher Technologies, LLC, St. Louis, MO (US)

(72) Inventor: Joseph Wells, Joplin, MO (US)

(73) Assignee: EAGLEPICHER TECHNOLOGIES, LLC, St. Louis, MO (US)

(*) Notice: Subject to any disclaimer, the term of this patent is extended or adjusted under 35 U.S.C. 154(b) by 0 days.

(21) Appl. No.: 16/292,415

(22) Filed: Mar. 5, 2019

(65) Prior Publication Data

US 2020/0287175 A1    Sep. 10, 2020

(51) Int. Cl.
| | |
|---|---|
| *H01M 10/04* | (2006.01) |
| *H01M 50/152* | (2021.01) |
| *H01M 50/109* | (2021.01) |
| *H01M 50/116* | (2021.01) |
| *H01M 50/147* | (2021.01) |
| *H01M 50/153* | (2021.01) |

(Continued)

(52) U.S. Cl.
CPC ..... *H01M 50/152* (2021.01); *H01M 10/0422* (2013.01); *H01M 50/109* (2021.01); *H01M 50/116* (2021.01); *H01M 50/147* (2021.01); *H01M 10/0427* (2013.01); *H01M 50/153* (2021.01); *H01M 50/169* (2021.01); *H01M 50/174* (2021.01); *H01M 50/183* (2021.01); *Y02E 60/10* (2013.01); *Y02P 70/50* (2015.11)

(58) Field of Classification Search
CPC ............ H01M 50/116; H01M 50/153; H01M 50/169; H01M 50/174; H01M 50/152; H01M 10/0422; H01M 10/0427; H01M 50/109; H01M 50/147; H01M 50/183; Y02E 60/10; Y02P 70/50
USPC ........................................................ 429/174
See application file for complete search history.

(56) References Cited

U.S. PATENT DOCUMENTS

| | | | | |
|---|---|---|---|---|
| 4,169,920 A | * | 10/1979 | Epstein | ................... G04C 10/00 429/154 |
| 4,233,372 A | | 11/1980 | Bro et al. | |

(Continued)

FOREIGN PATENT DOCUMENTS

KR    101310158    *    9/2013

OTHER PUBLICATIONS

KR 101310158—translation.*

*Primary Examiner* — Cynthia H Kelly
*Assistant Examiner* — Omar M Kekia
(74) *Attorney, Agent, or Firm* — Cantor Colburn LLP

(57) ABSTRACT

A coin cell having a hermetic design withstands high performance applications including high temperature missions from a drop in replacement envelope. The coin cell can include a container having a bottom wall and a surrounding wall that form an interior volume, and the surrounding wall can include an inner, upper peripheral edge, at a top of the surrounding wall. The coin cell can include an anode assembly; a cathode assembly; and a header ring including a header ring outer surface and a header ring inner surface that defines an opening. The coin cell can include an insulator ring that includes an insulator ring outer surface that extends along and inside of the header ring inner surface, and an insulator ring inner surface that defines an opening within the insulator ring. A pin can be provided in the opening of the insulator ring. The coin cell can include an electrolyte.

18 Claims, 5 Drawing Sheets

(51) Int. Cl.
*H01M 50/169* (2021.01)
*H01M 50/183* (2021.01)
*H01M 50/174* (2021.01)

(56) References Cited

U.S. PATENT DOCUMENTS

| | | | | |
|---|---|---|---|---|
| 4,609,598 | A * | 9/1986 | Tucholski | H01M 50/543 |
| | | | | 429/174 |
| 5,004,656 | A | 4/1991 | Sato et al. | |
| 5,500,026 | A * | 3/1996 | Heller | H01M 50/174 |
| | | | | 29/623.1 |
| 6,984,468 | B2 | 1/2006 | Rubino et al. | |
| 7,022,146 | B2 | 4/2006 | Rubino et al. | |
| 2004/0137319 | A1 * | 7/2004 | Warchocki | H01M 2/06 |
| | | | | 429/175 |
| 2006/0093916 | A1 * | 5/2006 | Howard | H01M 4/525 |
| | | | | 429/231.95 |
| 2007/0109721 | A1 | 5/2007 | Sato et al. | |
| 2014/0087239 | A1 | 3/2014 | Tischendorf | |
| 2015/0229001 | A1 * | 8/2015 | Itani | H01M 10/056 |
| | | | | 429/149 |
| 2019/0214607 | A1 * | 7/2019 | Yildiz | H01M 2/0465 |

* cited by examiner

BATTERIES AND METHODS OF USING AND MAKING THE SAME

BACKGROUND

The disclosed subject matter relates to batteries, and methods of use and manufacture thereof. More particularly, the disclosed subject matter relates to batteries that may include a coin cell or button cell.

A coin cell battery can be in the form of a small single cell battery that is in the shape of a squat or short cylinder. Illustratively, a coin cell can be in the shape of a coin or button for clothing. A known coin cell can include a metal container or can shaped structure that forms a first part of the coin cell, which provides a first polarity terminal of the cell. The first polarity terminal of the cell can be the positive terminal of the cell, for example. The coin cell can include an insulated top or cap that is provided on top of the container shaped structure. The insulated top can provide a second polarity terminal of the cell, such as the negative terminal of the cell. The insulated top can be insulated from the container of the coin cell.

A coin cell can be used so as to provide power to various electronics. In particular, a coin cell can be used to power small portable electronic devices. Such electronic devices can include implantable medical devices, wrist or handheld watches, portable calculators, hearing aids, and other small devices.

However, there are various problems associated with the above described and other known technology.

SUMMARY

One substantial limitation with existing coin cells is the lack of a hermetic seal, which can present challenges in high performance applications. This deficiency has risks regarding the containment of the cell's liquid electrolyte that, depending upon the cell chemistry, may be toxic, corrosive, or flammable. One example of this limitation is the use of coin cells in implantable medical devices, where the potential leakage of electrolyte from coin cells could risk potential health hazards for the patient and/or endanger the functionality, performance, and reliability of both the coin cell(s) and the device.

Batteries and methods of using and making batteries are provided. A coin cell can include a container that includes a bottom wall and a surrounding wall that collectively form an interior volume, and the surrounding wall can include an inner, upper peripheral edge, at a top of the surrounding wall, that defines an opening. The coin cell can further include an anode assembly provided in the interior volume; a cathode assembly provided in the interior volume; and a header ring. The header ring can include a header ring outer surface that extends along and inside of the inner, upper peripheral edge of the surrounding wall, and a header ring inner surface that defines an opening within the header ring. The coin cell can further include an insulator ring that includes an insulator ring outer surface that extends along and inside of the header ring inner surface, and an insulator ring inner surface that defines an opening within the insulator ring. The coin cell can further include a pin that includes a pin outer surface, and the pin provided in the opening of the insulator ring. The interior volume can be formed by the container in conjunction with the header ring, insulator ring and pin. The coin cell can further include electrolyte contained in the interior volume.

Various further aspects and features of the disclosure are described below.

BRIEF DESCRIPTION OF THE DRAWINGS

The present disclosure is illustrated by way of example, and not by way of limitation, in the figures of the accompanying drawings and in which like reference numerals refer to similar elements and in which.

Figure 1:
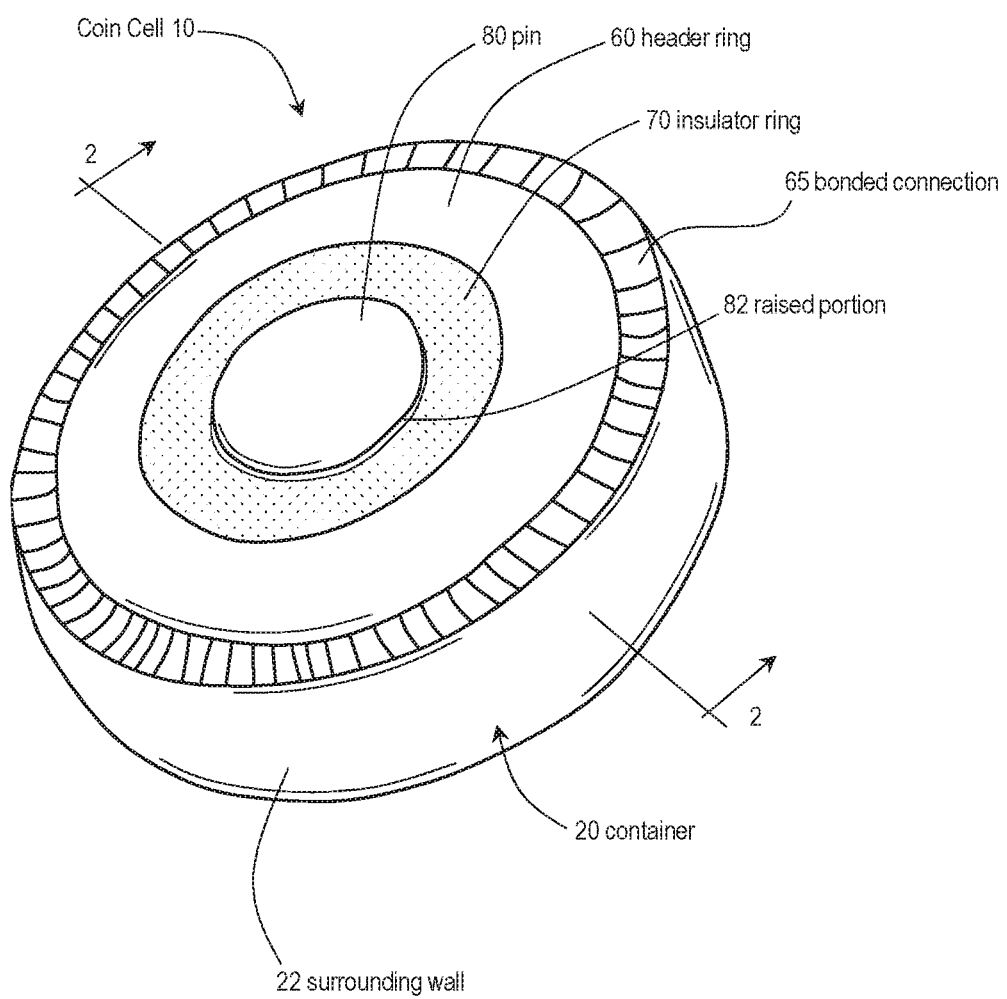
FIG. 1 illustrates a perspective view of a coin cell, in accordance with one or more embodiments of the disclosure.

Unless otherwise indicated illustrations in the figures are not necessarily drawn to scale.

DETAILED DESCRIPTION OF THE DISCLOSURE

The present disclosure relates generally to the field of coin cells or button cells. The coin cells of the present disclosure can be useful for an electrochemical cell that can power implantable medical devices as well as a variety of other devices.

The disclosure provides a hermetically sealed coin cell design for either primary or secondary cells (i.e., non-rechargeable or rechargeable cells). In accordance with one or more embodiments of the disclosure, glass to metal seals (GTMS) in the coin cell design, on either the cell negative or positive, can be used to allow elimination of an internal plastic crimp and associated seal, which can be problematic in known coin cells. A coin cell of the disclosure can be sealed via welding or soldering to create the requisite hermetic seal. Various further aspects and features of the disclosure are described below.

Various types of coin cells, which can also be called button cells, are known. Illustratively, commercial coin cells of various diameters and heights are known. Coin cells can be manufactured with a metallic top and a metallic bottom. These two halves can be crimped together with an internal plastic ring so as to form a coin cell. However, known coin cells are associated with problems. Commercial coin cells can swell during exposure to electrolyte expansion. The swelling causes the internal crimp-seal to leak electrolyte. This subsequently leads to corrosion of the exterior of the cell after exposure to high temperature storage and/or operation at high temperatures. For example, known coin cells can leak past the crimp-seal during high temperature storage of, illustratively, up to +200 degrees Fahrenheit. For example, known coin cells can leak past the crimp-seal during high temperature use of, illustratively, up to +160 degrees Fahrenheit.

As described above, known coin cells can be sealed with a plastic washer and then crimped as a final step in the assembly process of such known coin cells. However, this known methodology fails to provide an effective hermetic seal. In one aspect of the disclosure, using a glass to metal seal (GTMS) can avoid utilization of the internal plastic crimp washer that is typically used in known coin cells. As a result, a portion of the cover of the coin cell can be welded to the positive container to provide a truly effective hermetic seal.

The disclosure provides a hermetic coin cell design for either primary or secondary cells (nonrechargeable or rechargeable cells). Commercial known coin cells can use one half of the container as the cell negative and the other half as the cell positive. As described above, the cell positive and negative can be isolated using an internal plastic ring. Such internal plastic ring provides mechanical spacing between cell positive components and cell negative components and therefore the internal plastic ring provides the electrical isolation between cell positive components and cell negative components.

The disclosure addresses the shortcomings of known coin cells. As described above, a coin cell of the disclosure can use glass to metal seals (GTMS's) in the coin cell design on either the cell negative or the cell positive. The arrangement provided by the disclosure can allow elimination, from the arrangement of the coin cell, of the internal plastic crimp and associated seal. A hermetic coin cell of the disclosure can be sealed utilizing welding or soldering to provide for a hermetic seal. Accordingly, the coin cells of the disclosure can provide a drop in replacement situation and can be used in high performance applications. The coin cells of the disclosure can allow for storage and function at higher temperatures, without leaking, as compared with known coin cells. Hermeticity of the coin cells of the disclosure can be verified after manufacturing by using a variety of leak-testing methods including visual inspections, leak testing, and destructive and nondestructive sampling methods. A coin cell of the disclosure can be used to replace known crimp-sealed commercial coin cells, which are used in high-performance environments and missions. These types of missions can include or require use in a wide range of temperatures, which can include use in high temperature environments. A coin cell of the disclosure can be used in such an environment without leakage. The coin cell of the disclosure can be used in high-performance missions including defense, aerospace, oil and gas applications, medical applications, and other applications, for example. The technology provided by the disclosure can be applicable to a wide range of coin cell platforms.

Hereinafter, aspects of the coin cell of the disclosure will be further described, in accordance with one or more embodiments of the disclosure.

Figure 2:
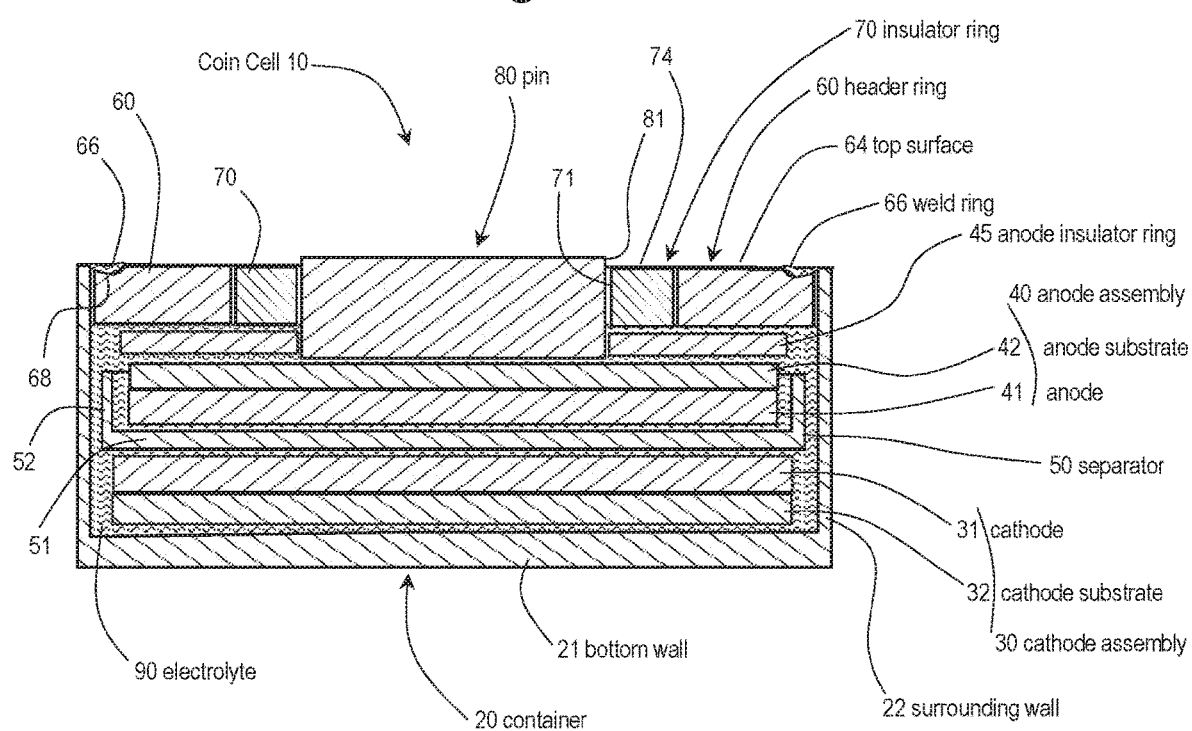
FIG. 2 is a cross-section view, along line 2-2 of FIG. 1, of a coin cell the same as or similar to the coin cell of FIG. 1, in accordance with one or more embodiments.

FIG. 1 illustrates a perspective view of a coin cell, in accordance with one or more embodiments of the disclosure. FIG. 2 is a cross-section view, along line 2-2 of FIG. 1, of a coin cell the same as or similar to the cell of FIG. 1, in accordance with one or more embodiments.

As shown in FIG. 2 the coin cell 10 includes a container 20, a header ring 60, an insulator ring 70, a pin 80 and electrolyte 90. As shown in FIG. 2, the coin cell 10 can also include a cathode assembly 30 and an anode assembly 40.

Figure 3:
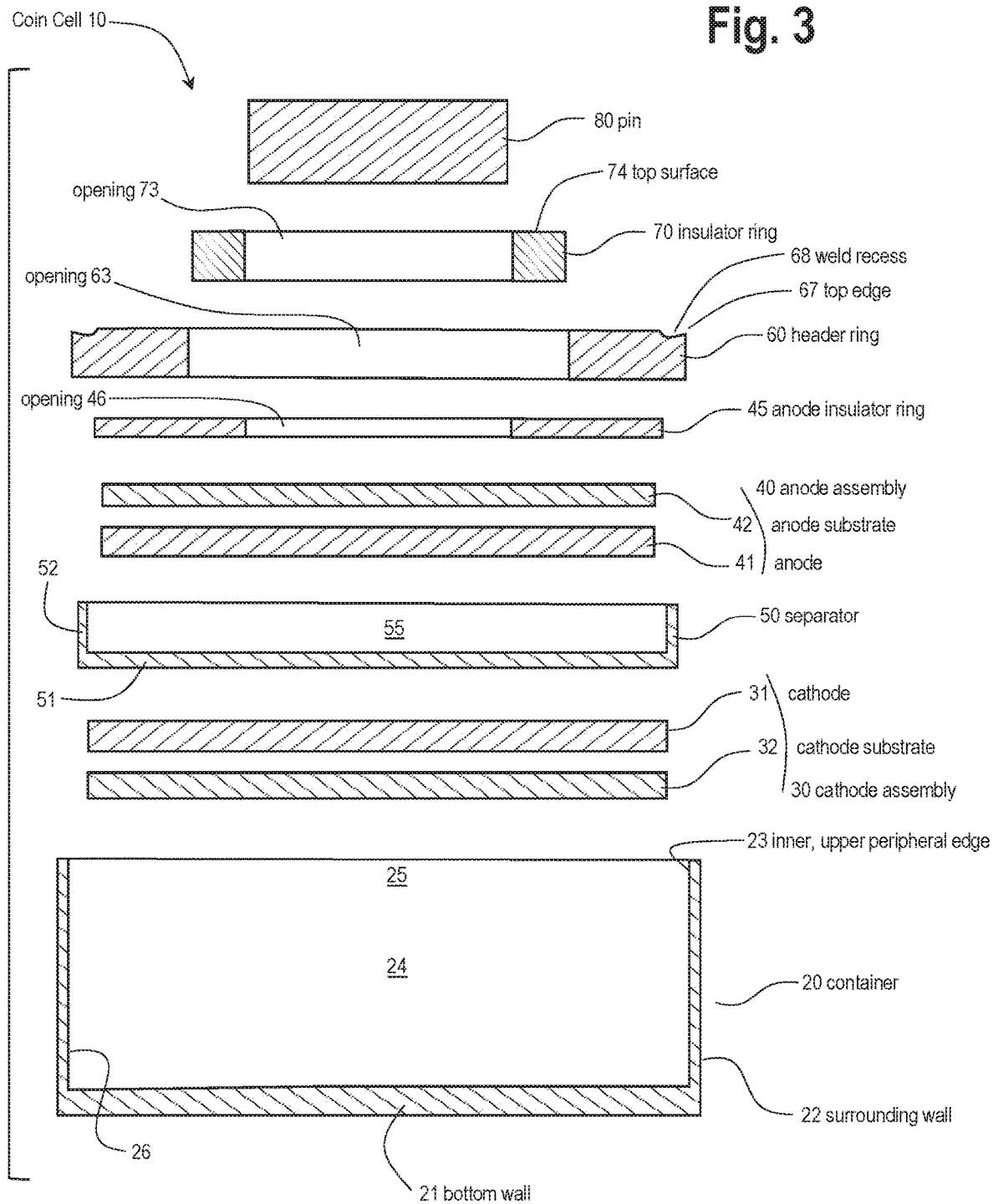
FIG. 3 is a cross-section, exploded view of or similar to the coin cell of FIG. 2, in accordance with one or more embodiments

The container 10 can include a bottom wall 21 and a surrounding wall 22. The bottom wall 21 and the surrounding wall 22 can collectively form an interior volume 24. As shown in FIG. 3, the surrounding wall 22 can include an inner, upper peripheral edge 23 that defines a top, inner edge of the surrounding wall 22. The surrounding wall 22 can be cylindrical in shape with the bottom wall 21 can be circular in shape. Accordingly, the inner, upper peripheral edge 23 can be circular in shape. The bottom wall 21 and the surrounding wall 22 can provide or define an interior volume 24. Various components of the coin cell can be disposed in the interior volume 24 as described below. The inner, upper peripheral edge 23 can define an opening 25 into the interior volume 24.

As shown in FIG. 2, an anode assembly 40 can be disposed in the interior volume 24. Further, a cathode assembly 30 can be disposed in the interior volume 24. As discussed in further detail below, the header ring 60 can be provided as a top or cap to the container 20. The header ring 60 can be attached or bonded to the inner, upper peripheral edge 23 of the surrounding wall 22. More specifically, the header ring 60 can include a header ring outer surface 62 that extends along and inside of the inner, upper peripheral edge 23 of the surrounding wall 22. The header ring outer surface 62 can be welded or soldered to the inner, upper peripheral edge 23 of the surrounding wall 22. Accordingly, a bonded connection 65 can be formed between the container 20 and the header ring 60. The bonded connection 65 can be characterized as constituting or forming a ring or weld ring 66, for example. The header ring 60 can be provided with a circular or annular weld recess 68 that extends around the outer perimeter or peripheral edge of a top surface 64 of the header ring 60. Accordingly, the header ring outer surface 62 can be connected along the inner, upper peripheral edge 23 of the surrounding wall 22.

The header ring can also include a header ring inner surface that defines an opening within the header ring. An insulator ring 70 can be provided in such opening of the header ring. The insulator ring 70 can include an insulator ring outer surface that extends along and inside of the header ring inner surface. Further details are described below with reference to FIGS. 4 and 5. In turn, the insulator ring inner surface 71 can define an opening within the insulator ring 70. A pin 80 can be disposed in the opening of the insulator ring 70. The pin 80 can include a pin outer surface 81. The pin 80, and in particular the pin outer surface 81, can be raised up from or extend up from a top surface of the insulator ring 70. As a result, the pin 80 can be characterized as including a raised portion 82. The raised portion 82 is the portion of the pin outer surface 81 that extends above the insulator ring 70.

In accordance with the embodiment shown in FIG. 1, the header ring 60, the insulator ring 70, and the pin 80 can provide a top or cap to the container 20. Accordingly, an interior volume 24 (as illustrated in FIG. 3) can be formed by the container 20 in conjunction with the header ring 60, the insulator ring 70, and the pin 80. Various components of the coin cell 10 including a cathode assembly and an anode assembly can be provided in such interior volume 24. Additionally, an electrolyte or electrolyte solution can be provided in the interior volume 24.

As described above, FIG. 2 is a cross-section view, along line 2-2 of FIG. 1, of a coin cell in accordance with one or more embodiments of the disclosure. As shown in FIG. 2, the insulator ring 70 includes an insulator ring inner surface 71. The pin 80 includes a pin outer surface 81. The pin outer surface 81 can extend along and inside of the insulator ring inner surface 71. The pin 80 can extend below the insulator ring inner surface 71. Relatedly, the pin 80 can be received into an opening 46 of the anode insulator ring 45. In other words, the anode insulator ring 45 can surround a lower portion of the pin 80 and pin outer surface 81.

The anode insulator ring 45, with received lower portion of pin 80, can be positioned above anode assembly 40. The anode assembly 40 can include an anode substrate 42 and an anode 41. The anode substrate 42 can be provided between a lower end of the pin 80 and the anode 41.

As shown in FIG. 2, the coin cell 10 can also include a cathode assembly 30. The cathode assembly 30 can include a cathode 31 and a cathode substrate 32. The cathode substrate 32 can be provided between the cathode 31 and the bottom wall 21. The coin cell 10 can further include a separator 50. The separator 50 can be positioned between and serve to separate the anode assembly 40 and the cathode assembly 30. The separator 50 can include a separator bottom wall 51 and a separator surrounding wall 52. The separator bottom wall 51 and the separator surrounding wall 52 can form a separator interior volume 55 as illustrated in FIG. 3. The anode assembly 40, including the anode 41, can be positioned within the separator interior volume 55.

As shown in FIG. 2, the header ring 60 and the insulator ring 70 can be of substantially the same thickness. Accordingly, a top surface 64 of the header ring 60 can be substantially flush or level with a top surface 74 of the insulator ring 70. Also, a bottom surface of the header ring 60 can be substantially flush or level with a bottom surface of the insulator ring 70, as illustrated in FIG. 2. The pin 80 can be received into and/or pass through an opening 73 of the insulator ring 70. As described above, the pin 80 can be raised up from the top surface 74 of the insulator ring 70 such that the pin extends above the top surface 74 of the insulator ring 70 and extends out of and above the insulator ring inner surface 71.

In accordance with one or more embodiments of the disclosure, the coin cell 10 can include one or more annular glass to metal seals (GTMS). The reason that the additional insulator is required is the minimum thickness of the GTMS to make a robust seal. It had to be thicker, so the insulating "donut" 45 keeps the anode assembly 40 from shorting to the header ring 60 (the header ring will typically be metal). A GTMS can be provided around the cathode assembly 30 and along an inner surface of the surrounding wall 22 so as to be provided between the cathode assembly and the inner surface of the surrounding wall. A GTMS can be provided around the anode assembly 40 and along an inner surface of the surrounding wall 22 so as to be provided between the anode assembly and the inner surface of the surrounding wall. Each of such glass to metal seals can be constituted by an annular ring.

As described above, the container 20, in conjunction with the header ring 60, the insulator ring 70, and the pin 80 can form an interior volume 24. Various components of the coin cell 10 including electrolyte 90 can be disposed or provided within the interior volume 24. In accordance with embodiments of the disclosure, the coin cell can be in the form of a circular or cylindrical coin or button, as such is illustrated in FIG. 1. However, it is appreciated that the disclosure is not limited to such shape. For example, the coin cell 10 can be in other forms or shapes such as a square, oval or elliptical in shape. In the case that the coin cell 10 is in the shape or form of a coin or button, i.e. circular in shape, the various components of the button cell 10 can be of matching shape. That is, the various components of the coin cell 10 can be in the shape of a circular plate or a circular ring, for example. The surrounding wall 22 of the housing or container 20 can be in the form of a cylinder with the bottom wall 21 being in the form of a circular plate or disc.

In accordance with at least one embodiment of the disclosure, the positioning of the anode 41 with anode substrate 42 relative to the cathode 31 and cathode substrate 32, vis-à-vis other components of the coin cell 10 can be such that the pin 80 can provide the negative contact of the coin cell 10 and the container and/or header ring 60 can provide the positive contact of the coin cell 10. Relatedly, it is appreciated that the header ring 60 and the surrounding wall 22 can be in the electrical connection with each other. The weld ring 66 can provide or enhance such electrical connection between the header ring 60 and the surrounding wall 22. However, it is appreciated that different relative positioning of the components of the cell 10, including in particular relative positioning of the anode assembly 40 and the cathode assembly 30, can result in the pin 80 being a positive connection and the header ring 60 and/or surrounding wall 22 being the negative connection.

The cross-sectional view of FIG. 2 shows the anode assembly 40 and the cathode assembly 30 provided in the interior volume 24 of the coin cell 10, along with or including electrolyte 90. The anode assembly 40 can be seated or received into the separator 50. As otherwise described herein, the separator 50 can include a separator bottom wall 51 and a separator surrounding wall 52.

It is appreciated that the relative sizes or dimensions of the container or housing 20 and the various other components of the coin cell 10 can vary as desired. Illustratively, such relative sizes or dimensions of the components can be varied so as to provide ease and efficiency in assembly of the coin cell 10 and to provide for sufficient room or volume for a desired amount of electrolyte. The size or dimensions of the components and the voids or spaces provided for the electrolyte 90 of the battery can be varied based on a variety of other attributes including desired performance of the coin cell 10, space constraints of the environment in which the coin cell 10 is to be implemented, and other considerations. It is appreciated that some dimensions of components, of the coin cell 10, can be more critical than other dimensions. For example, relative dimensions of the header ring outer surface 62 relative to the inner surface 26 of the surrounding wall 22 can be important in providing ease of assembly while still providing a sufficiently tight seal so as to contain electrolyte 90. The weld ring 66 can provide or enhance a seal between the header ring 60 and the surrounding wall 22. Relatedly, FIG. 2 illustrates weld ring 66 provided in a weld recess 68. FIG. 3 also illustrates weld recess 68. In accordance with at least some embodiments of the disclosure, the weld recess 68 can be provided along an outer top edge 67, around an outer perimeter, of the header ring 60. However, such weld recess 68 may or may not be provided. Such weld recess may indeed be provided or generated by the welding process itself, i.e. the outer perimeter of the header ring being flat or level prior to welding (the header ring 60 to the surrounding wall 22) and the outer perimeter of the header ring 60 being concave or recessed as a result of the welding process. Relatedly, it is appreciated that connection or securement of the header ring 60 to the container 20, and specifically to the surrounding wall 22, is not limited to welding. Other attachment or bonding techniques may be utilized, including soldering to other fusion techniques, so as to join such components.

As described above, it is appreciated that relative size and positioning of some components relative to other components can be important. Accordingly, desired tolerancing and machining can be utilized to attain a desired "fit" between components. As described above, the fit between the header ring outer surface 62 and the inner surface 26 of the surrounding wall 22 can be important. The fit between the header ring inner surface 61 and the insulator ring outer surface 72 can be important including providing sufficient clearance for ease of assembly while providing a sufficiently tight fit to ensure and provide desired containment of the interior volume 24. The fit between the insulator ring inner surface 71 and the pin outer surface 81 can be important so as to provide sufficient clearance for ease of assembly while providing a sufficiently tight fit to ensure and provide desired containment of the interior volume 24. Relatedly, it is appreciated that the insulator ring 70 can be constructed of rubber, elastomeric, or other elastic material. Such material can be utilized to provide the desired insulation between the pin 80 and the header ring 60 and to provide for variance in the header ring inner surface 61 vis-à-vis the pin outer surface 81. Accordingly, needed tolerancing of such surfaces can be performed at a manageable and cost-effective level.

Figure 4:
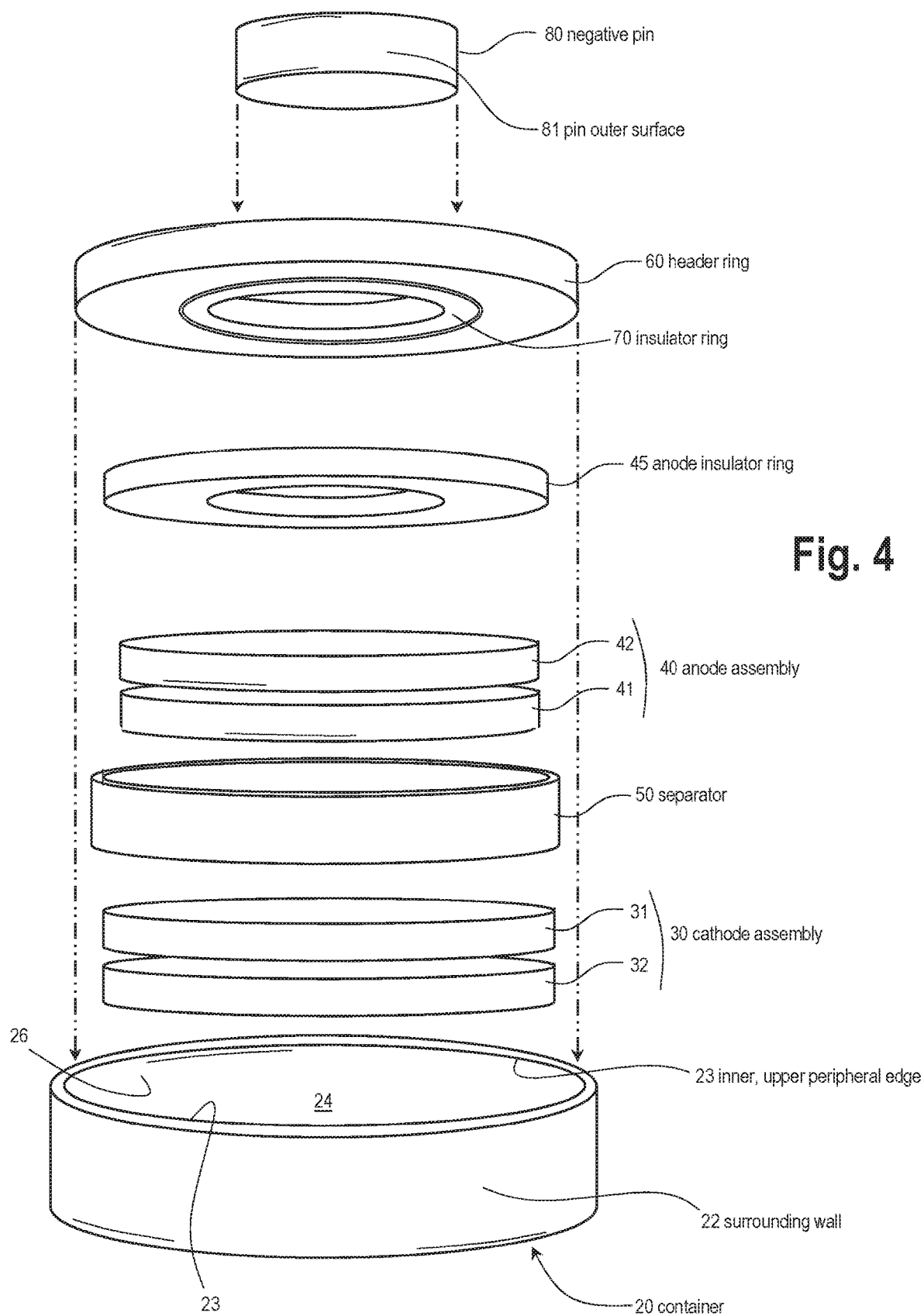
FIG. 4 is an exploded view of or similar to the coin cell of FIG. 2, in accordance with one or more embodiments.

As described above, FIG. 3 is a cross-section, exploded view of the coin cell of FIG. 2, in accordance with one or more embodiments. Also, FIG. 4 is an exploded view of a coin cell, in accordance with one or more embodiments. It is appreciated, as otherwise described herein, that the size, dimensions, thickness, relative positioning, and other spatial attributes of the coin cell 10 may be varied as desired. For example, the cathode 31, cathode substrate 32, anode 41, and anode substrate 42 can each be in the form of a circular plate or disc.

Figure 5:
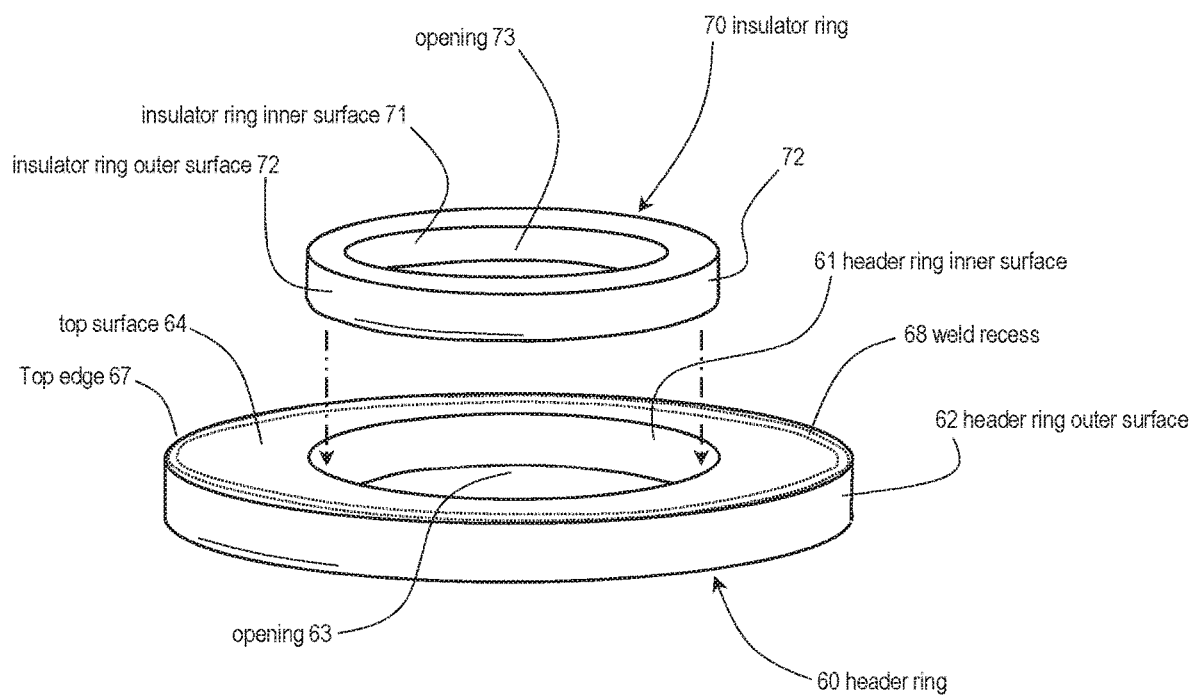
FIG. 5 is a perspective view of a header ring and an insulator ring of or similar to the coin cell of FIG. 2, in accordance with one or more embodiments.

FIG. 5 is a perspective view of a header ring and an insulator ring of the coin cell of FIG. 4, in accordance with one or more embodiments. As shown in FIG. 5, a weld recess 68 can extend around an outer periphery or area of the top surface 64 of the header ring 60. The insulator ring 70 can be received into the header ring inner surface 61. As described above, a thickness of the insulator ring 70 can be the same or substantially the same as a thickness of the header ring 60. As illustrated in FIG. 5, the insulator ring 70 can be received into an opening 63 in the header ring 60, so as to be mated with the header ring 60.

The coin cell 10 of the disclosure, as described above, can provide various features and advantages. The coin cell 10 of the disclosure can include incorporation of a glass to metal seal (GTMS's) in the positive and/or negative container sides of the coin cell 10. The glass to metal seal can allow welding, soldering, or other closure methods, and provide a hermetic seal of the top and bottom of the coin cell 10.

Construction of a coin cell in accordance with the disclosure can provide drop in replacement for other known coin cells. Accordingly, the coin cell of the disclosure can provide drop in replacement for currently available commercial cells. One or more coin cells of the disclosure can be used in applications requiring a single cell or multiple cells, which can be stacked in series, to make or provide a multi-cell battery. As otherwise described herein, a coin cell of the disclosure can be constructed so as to include a slightly raised negative pin, i.e. raised portion 82 as shown in FIG. 1, for example, to ensure contact equivalent to known cells and so as to provide an enhanced replacement for known cells. The amount or degree that the pin 80 extends up from the insulator ring 70 can be varied as desired. For example, if the intended use is to include stacking of a plurality of the coin cells 10, then the pin 80 may extend or protrude further than if stacking of a plurality of the coin cells is not anticipated.

Weld or solder construction can be utilized instead of crimping, in accordance with aspects of the disclosure. Closure of the cell or coin cell by welding, soldering, or other heat fusion or fusion technique can provide a truly hermetic design that can be provided to not leak under high temperature in either storage or operation. As otherwise described herein, the design also includes an insulator ring 70. The insulator ring 70 can be provided on the top of the coin cell 10 between the header ring 60 and the pin 80. The insulator ring 70 on the top of the cell (within allowable dimensions) can be provided to ensure that contact on the top of the cell 10 is only through the pin 80. In accordance with aspects of the disclosure, the pin 80 can be the negative pin of the coin cell 10.

As otherwise described herein, the coin cell 10 of the disclosure can provide higher temperature performance. The cell design can allow for swelling under higher temperature storage and operating conditions while maintaining hermeticity. The coin cell of the disclosure can be useful for an electrochemical cell that can power implantable medical devices and can be constructed of material so as to be configured to be implanted or implantable in a human or other living creature. The coin cell of the disclosure can be manufactured using commercialized production methods such as automation. Cells can be either primary or secondary cells (non-rechargeable or rechargeable), so multiple anode and cathode materials would be utilized depending upon the specific cell design. Anode materials would include materials such as alkali metals and alkaline earth metals such as metallic lithium, lithium alloys, and graphites with lithium additives. Metallic Sodium, Potassium, Magnesium, & Calcium and their associated alloys and infused graphites are some of the anode candidates. Cathodes would include (but not limited to), Carbon MonoFluoride (CFx), Manganese Dioxide (MnO2), CFx/MnO2 hybrid blends, Vanadium Oxides (VxOx), with many secondary Cathodes such as Nickel Manganese Cobalt (NCM), Nickel Cobalt Aluminum (NCA), Iron Phosphate (FePO4), etc.

It is appreciated that the various components of embodiments of the disclosure may be made from any of a variety of materials including, for example, metal, copper, stainless steel, nickel, titanium, plastic, plastic resin, nylon, composite material, glass, and/or ceramic, for example, or any other material as may be desired or as necessitated by the application. A variety of production techniques may be used to make the apparatuses as described herein. For example, suitable casting and/or injection molding and other molding techniques, welding, soldering, bending techniques, and other manufacturing techniques might be utilized.

The various apparatuses and components of the apparatuses, as described herein, may be provided in various sizes, shapes, and/or dimensions, as desired.

It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

It will be understood that when an element or layer is referred to as being "onto" another element or layer, the element or layer can be directly on another element or layer or intervening elements or layers. Examples include "attached onto", secured onto", and "provided onto". In contrast, when an element is referred to as being "directly onto" another element or layer, there are no intervening elements or layers present. As used herein, "onto" and "on to" have been used interchangeably.

It will be understood that when an element or layer is referred to as being "attached to" another element or layer, the element or layer can be directly attached to the another element or layer or intervening elements or layers. In contrast, when an element is referred to as being "attached directly to" another element or layer, there are no intervening elements or layers present. It will be understood that such relationship also is to be understood with regard to: "secured to" versus "secured directly to"; "provided to" versus "provided directly to"; "connected to" versus "connected directly to" and similar language.

As used herein, the term "and/or" includes any and all combinations of one or more of the associated listed items. The singular forms "a", "an" and "the" can include plural referents unless the context clearly dictates otherwise.

The term "optional" or "optionally" means that the subsequently described event, feature or circumstance may or may not occur, and that the description includes instances where the event, feature or circumstance occurs and instances where the event, feature or circumstance does not.

It will be understood that, although the terms first, second, third, etc., may be used herein to describe various features, elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper", "top", "bottom", "left", "right" and the like, may be used herein for ease of description to describe the relationship of one element or feature to another element(s) or feature(s) as illustrated in the drawing figures. It will be understood that spatially relative terms are intended to encompass different orientations of structures in use or operation, in addition to the orientation depicted in the drawing figures. For example, if a device in the drawing figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the disclosure. As used herein, the singular forms "a", "an" and "the" are intended to include the plural forms as well, unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to diagrams and/or cross-section illustrations, for example, that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of components illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment.

Further, as otherwise noted herein, when a particular feature, structure, or characteristic is described in connection with any embodiment, it is submitted that it is within the purview of one skilled in the art to effect and/or use such feature, structure, or characteristic in connection with other ones of the embodiments.

Embodiments are also intended to include or otherwise cover methods of using and methods of manufacturing any or all of the elements disclosed herein.

While the subject matter has been described in detail with reference to exemplary embodiments thereof, it will be apparent to one skilled in the art that various changes can be made, and equivalents employed, without departing from the scope of the disclosure.

All related art references and art references discussed herein are hereby incorporated by reference in their entirety. All documents referenced herein are hereby incorporated by reference in their entirety.

It will be understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present disclosure and is made to provide an enabling disclosure of the disclosure. Accordingly, the foregoing disclosure is not intended to be construed or to limit the present disclosure or otherwise to exclude any other such embodiments, adaptations, variations, modifications and equivalent arrangements.

What is claimed is:

1. A hermetic coin cell designed to withstand high performance applications, the hermetic coin cell comprising:
   a container that includes a bottom wall and a surrounding wall that collectively form an interior volume, the surrounding wall including an inner, upper peripheral edge at a top of the surrounding wall that defines an opening;
   an anode assembly provided in the interior volume;
   a cathode assembly provided in the interior volume;

a header ring that includes:
- a header ring outer surface that extends along and inside of the inner, upper peripheral edge of the surrounding wall, and
- a header ring inner surface that defines an opening within the header ring;

an insulator ring disposed between the header ring and a pin, the insulator ring and the header ring each forming part of a top surface of a cap of the hermetic coin cell, a lower portion of the pin extending below the insulator ring surface and terminating within the interior volume, the insulator ring including:
- an insulator ring outer surface that extends along and inside of the header ring inner surface, and
- an insulator ring inner surface that defines an opening within the insulator ring; and the pin that includes a pin outer surface, the pin provided in the opening of the insulator ring, the interior volume being formed by the container in conjunction with the header ring, insulator ring and the pin;

an anode insulator ring that is positioned above the anode assembly and below the header ring and the insulator ring, the anode insulator ring surrounding the lower portion of the pin within the interior volume; and electrolyte contained in the interior volume.

2. The hermetic coin cell according to claim 1, wherein the pin outer surface extends along and inside of the insulator ring inner surface.

3. The hermetic coin cell according to claim 1, wherein the anode assembly includes an anode and an anode substrate, and the anode substrate is provided between a lower end of the pin and the anode.

4. The hermetic coin cell according to claim 3, the cathode assembly including a cathode and a cathode substrate, and the cathode substrate is provided between the cathode and the bottom wall.

5. The hermetic coin cell according to claim 4, further including a separator that is positioned between the anode assembly and the cathode assembly.

6. The hermetic coin cell according to claim 5, wherein the separator includes a separator bottom wall and a separator surrounding wall that collectively form a separator interior volume, the anode assembly being positioned within the separator interior volume.

7. The hermetic coin cell according to claim 1, the header ring and the insulator ring being a same thickness, and a top surface of the header ring being flush with a top surface of the insulator ring.

8. The hermetic coin cell according to claim 7, the pin being raised from the top surface of the insulator ring such that the pin extends above the insulator ring inner surface.

9. The hermetic coin cell according to claim 1, the pin being raised from a top surface of the insulator ring.

10. The hermetic coin cell according to claim 1, wherein an annular glass to metal seal (GTMS) is provided around the cathode assembly and along an inner surface of the surrounding wall, so as to be provided between the cathode assembly and the inner surface of the surrounding wall.

11. The hermetic coin cell according to claim 10, wherein an annular GTMS is provided around the anode assembly and along an inner surface of the surrounding wall, so as to be provided between the anode assembly and the inner surface of the surrounding wall.

12. The hermetic coin cell according to claim 11, wherein the annular GTMS has cell hermeticity.

13. The hermetic coin cell according to claim 1, wherein an annular GTMS is provided around the anode assembly and along an inner surface of the surrounding wall, so as to be provided between the anode assembly and the inner surface of the surrounding wall.

14. The hermetic coin cell according to claim 1, the header ring outer surface being connected along the inner, upper peripheral edge of the surrounding wall by a bonded connection.

15. The hermetic coin cell according to claim 14, wherein the bonded connection is at least one of a welded connection and a soldered connection, and wherein the bonded connection is in the form of a ring that extends around a top edge of the header ring outer surface.

16. The hermetic coin cell according to claim 1, the surrounding wall of the container is in the form of a cylinder.

17. The hermetic coin cell according to claim 1, the cell is constructed of material so as to be configured to be an implantable in a human.

18. The hermetic coin cell according to claim 1, wherein the anode assembly is provided between the cathode assembly and the pin, and wherein the pin is of negative polarity and the surrounding wall is of positive polarity.

* * * * *